US008332666B2

(12) United States Patent  
Boss et al.

(10) Patent No.: US 8,332,666 B2  
(45) Date of Patent: Dec. 11, 2012

(54) POWER MANAGEMENT METHOD AND SYSTEM

(75) Inventors: Gregory Jensen Boss, Saginaw, MI (US); Rick Allen Hamilton, II, Charlottesville, VA (US); Julianne Frances Haugh, Austin, TX (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 12/631,935

(22) Filed: Dec. 7, 2009

(65) Prior Publication Data

US 2011/0138198 A1 Jun. 9, 2011

(51) Int. Cl.
*G06F 1/00* (2006.01)
*G06F 1/26* (2006.01)
*G06F 1/32* (2006.01)

(52) U.S. Cl. ......... 713/300; 713/310; 713/320; 713/324

(58) Field of Classification Search ............... 713/310, 713/320, 300, 324
See application file for complete search history.

(56) References Cited

U.S. PATENT DOCUMENTS

| 6,049,879 | A | * | 4/2000 | Davis et al. ................... 713/300 |
| 6,603,218 | B1 | * | 8/2003 | Aisa ............................... 307/31 |
| 6,961,641 | B1 | | 11/2005 | Forth et al. |
| 2006/0229768 | A1 | | 10/2006 | Chassin et al. |
| 2006/0255791 | A1 | * | 11/2006 | Messing et al. ................. 324/98 |
| 2007/0030613 | A1 | * | 2/2007 | Sousa et al. .................... 361/92 |
| 2007/0203860 | A1 | * | 8/2007 | Golden et al. ................. 705/412 |
| 2007/0222294 | A1 | * | 9/2007 | Tsukida et al. ................. 307/29 |
| 2008/0167931 | A1 | | 7/2008 | Gerstemeier et al. |
| 2008/0185451 | A1 | | 8/2008 | Simon et al. |

FOREIGN PATENT DOCUMENTS

| EP | 0621676 | 4/1994 |
| WO | WO 2006096854 | 12/2009 |

* cited by examiner

*Primary Examiner* — Thomas Lee
*Assistant Examiner* — Terrell Johnson
(74) *Attorney, Agent, or Firm* — Schmeiser, Olsen & Watts; Anna Linne

(57) ABSTRACT

A power management method and system. The method includes retrieving and storing by a computer processor, identification data identifying power consumption devices. Each power consumption device receives an input voltage signal and consumes power. The computer processor monitors a power consumption level for each power consumption device. The computer processor disables each power consumption device from receiving and consuming power. The computer processor generates an association list associating each power consumption level with the identification data. The computer processor generates and stores a prioritization list indicating an order of priority for disabling the power consumption devices.

13 Claims, 5 Drawing Sheets

POWER MANAGEMENT METHOD AND SYSTEM

FIELD OF THE INVENTION

The present invention relates to a method and associated system for managing a voltage signal associated with providing power to devices.

BACKGROUND OF THE INVENTION

Managing power from a power provider for various power consumption devices typically comprises an inaccurate process with little flexibility. Power provided by power providers typically varies depending on conditions. Varying power may cause power consumption devices to malfunction.

SUMMARY OF THE INVENTION

The present invention provides a power management method comprising:

retrieving, by a computer processor of a computing system, identification data identifying a plurality of power consumption devices at a specified location;

storing, by said computer processor, said identification data;

independently enabling, by said computer processor, each power consumption device of said plurality of power consumption devices such that each said power consumption device receives an input voltage signal and consumes power;

independently monitoring, by said computer processor in response to said independently enabling, a power consumption level for each said power consumption device;

after said independently monitoring, independently disabling by said computer processor, each said power consumption device such that each said power consumption device does not receive said input voltage signal and consume power;

after said independently disabling, generating by said computer processor, an association list, wherein said generating said association list comprises associating each said power consumption level with said identification data such that each said power consumption level is associated with a different power consumption device of said plurality of power consumption devices;

generating, by said computer processor from said association list and based on each said power consumption level and user input, a prioritization list indicating an order of priority for disabling or enabling said plurality of power consumption devices; and storing, by said computer processor, said prioritization list.

The present invention provides a power management method comprising:

retrieving, by a computer processor of a computing system, identification data identifying groups of power consumption devices at multiple locations, wherein each group of said groups of said power consumption devices is associated with a different location of said multiple locations, and wherein said computing system is located external to said multiple locations;

storing, by said computer processor, said identification data;

retrieving, by said computer processor from said multiple locations, power consumption level data comprising power consumption levels for each power consumption device of said groups of said power consumption devices;

generating by said computer processor, an association list, wherein said generating said association list comprises associating said power consumption levels with said identification data such that each power consumption level of said power consumption levels is associated with a different power consumption device of said power consumption devices;

generating, by said computer processor from said association list and based on each said power consumption level and user input, a prioritization list indicating an order of priority for disabling or enabling each said power consumption device; and storing, by said computer processor, said prioritization list.

The present invention advantageously provides a simple method and associated system capable of managing power for various power consumption devices.

DETAILED DESCRIPTION OF THE INVENTION

Figure 1:
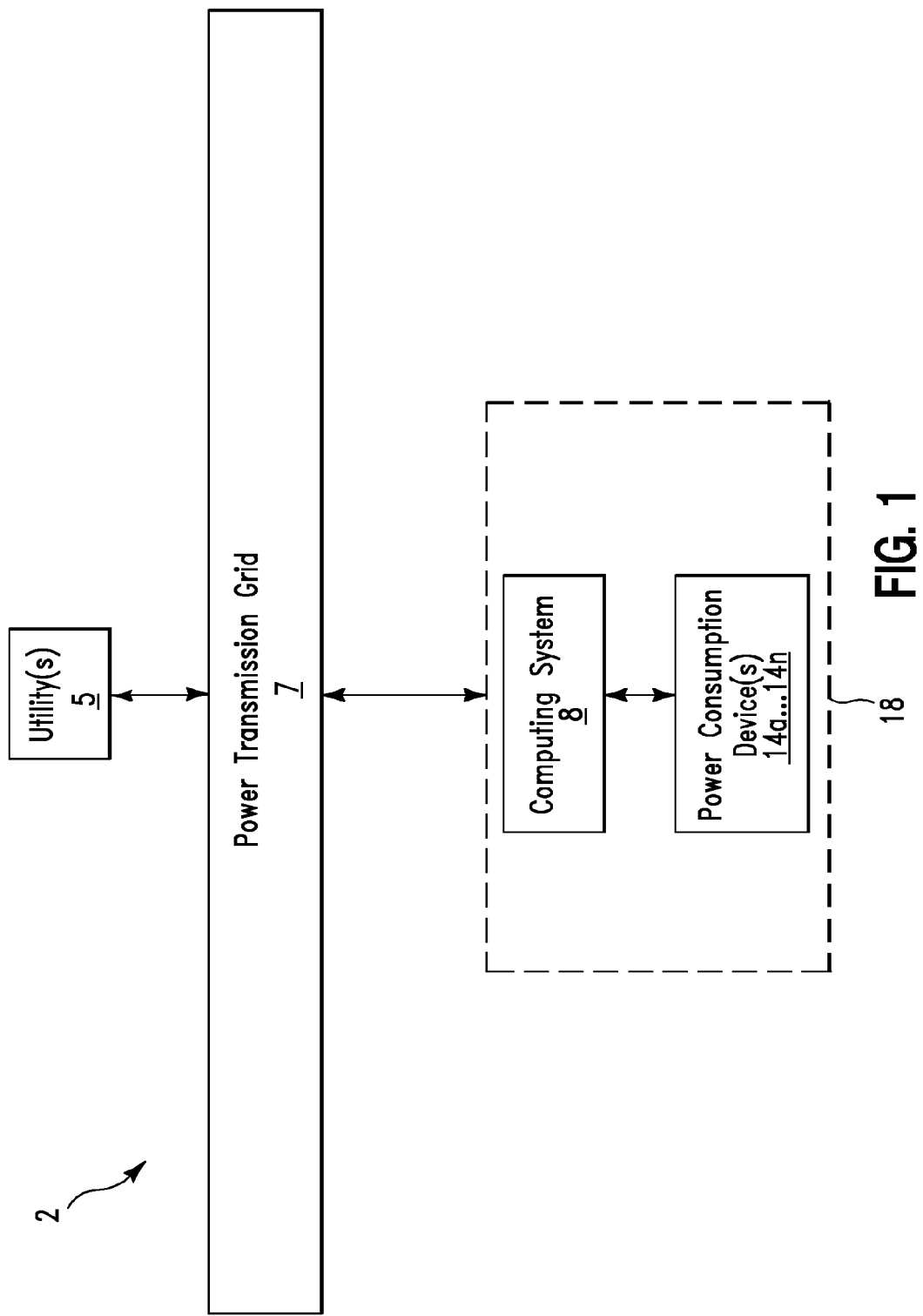
FIG. 1 illustrates a system for performing a load adjustment modification process, in accordance with embodiments of the present invention.

FIG. 1 illustrates a system 2 for monitoring a frequency signal associated with a supply voltage retrieved from a power grid and performing a load adjustment modification process with respect to power consumption devices 14a . . . 14n based on a value of the frequency signal and a prioritization list, in accordance with embodiments of the present invention. System 2 comprises an intelligent system for preventing load fluctuations associated with power usage by electrical devices (e.g., appliances such as a furnace turning on or off). Power usage by the electrical devices may cause a frequency signal (e.g., 60 Hertz (Hz)) associated with a supply voltage retrieved from a power grid (e.g., power transmission grid 7) to fluctuate (e.g., rise or fall). Therefore, system 2 is enabled to monitor the frequency signal and perform a load adjustment modification process (e.g., automatically turning power consumption devices 14a . . . 14n on and off) based on a monitored value of the frequency signal and a prioritization profile. When the frequency signal drops (i.e., indicating that a load exceeds a supply on power transmission grid 7), the load should be reduced quickly. System 2 determines devices to throttle or turn off and a subsequent order based on device power usage and an amount of supply shortage. System 2 determines which power consumption device to turn off to reduce a power load on power transmission grid 7. For example, it may be desirable to turn off an air conditioner compressor motor before a blower motor because the air conditioner compressor motor consumes much more energy and will have a greater effect on power demand. System is aware of all participating devices and their power usage patterns.

System 2 comprises a computing system 8 connected to a utility(s) 5 through a power transmission grid 7. Computing system 8 is additionally connected to power consumption devices 14a . . . 14n. Computing system 8 and power consumption devices 14a . . . 14n are located within a specified location 14. Specified location 14 may comprise a house and surrounding property, a building (associated with a business) and surrounding property, etc. Power consumption devices 14a . . . 14n may comprise any type of electrical device that consumes electrical power (e.g., appliances, a furnace, an oven, an air conditioner, a computer, a hot water tank, an electric heater, etc) provided by utility(s) 5. Electrical power may be retrieved via a power grid (e.g., power transmission grid 7). Utility 5 may comprise any type of electrical power supplier that produces and/or distributes electrical power. Utilities 5a . . . 5n may produce and/or distribute any type of electrical power including, inter alia, fossil fuel generated power, steam generated power, hydro generated power, solar generated power, wind generated power, fuel cell generated power, etc. Computing system 8 may comprise relays or contactors for enabling or disabling power to power consumption devices 14a . . . 14n. Alternatively, each of power consumption devices 14a . . . 14n may comprise a relay or contactor that receives a control signal from computing system 8 and in response enables or disables power to power consumption devices 14a . . . 14n. Computing system 8 may comprise a memory system. The memory system may comprise a single memory system. Alternatively, the memory system may comprise a plurality of memory systems. The memory system may be internal to computing system 8 or external to computing system 8. Computing system 8 may comprise a software application for controlling functionality. Computing system 8 may communicate with utility(s) using any method including, inter alia, power line communication (PLC), IP-over-power, Internet, wireless, etc. PLC comprises a system for carrying data on a conductor used for electric power transmission. IP-over-Power comprises a system for using PLC by sending and receiving radio signals over power lines to provide access to the Internet.

Computing system 8 comprises a system for monitoring a power grid (e.g., associated with power generated by utility(s) 5) frequency (e.g., 60 Hertz (Hz)) and adjusting a load associated with power consumption devices 14a . . . 14n based on a value of the monitored frequency. Although system 2 is described with respect to monitoring a nominal frequency of 60 Hz (i.e., associated with power generated by utility(s) 5 and used in power generation in the United States), note that system 2 may be used to monitor any nominal frequency value. For example, system 2 may be used to monitor a nominal frequency value of 50 Hz (i.e., used in Europe, Africa, Asia, Australia, etc). System 2 performs the following process:

When a frequency drop is detected and a load (i.e., associated with a power consumption of power consumption devices 14a . . . 14n) must be decreased, power consumption devices (e.g., power consumption devices 14a . . . 14n) may be turned off or down. Conversely, when a frequency increase is detected, power consumption devices (e.g., power consumption devices 14a . . . 14n) may be turned on or up. System 2 enables a function by which the further the frequency deviates from a 60 Hz nominal value, the more and potentially faster system 2 responds. Large load or generation transients result in rapid changes in a power system frequency (e.g., frequency associated with Utility(s) 5), which is immediately detectable throughout a power grid interconnect. For example, the loss of a significant power generation capacity (supply) results in a power system voltage and power system frequency falling below nominal values. Likewise, a loss of a significant load (demand), such as a transmission line to an urban area tripping due to accident, lighting strike, or failure of a power substation results in a power system voltage and frequency rising above a nominal value. The coupling of a power system frequency and voltage is a result of rotating masses which are used to generate a majority of power. As a load increases, additional fuel must be provided to maintain the same power output. If additional fuel (e.g., in the form of steam or combustion) is not added, the rotation speed of the turbine or prime mover drops and the output frequency falls with it. As the load decreases, fuel must be reduced in the same manner.

System 2 may be used to automatically turn on or off power consumption devices 14a . . . 14n in response to a monitored power system frequency and a prioritization list indicating a shutdown order for each of power consumption devices 14a . . . 14n. As the power system frequency level drops, devices on the prioritization list may be independently disconnected until the frequency level rises to a normal value (e.g., 60 Hz). Likewise, if the power system frequency rises above a normal level, devices on the prioritization list may be independently enabled until the frequency level drops to a normal value (e.g., 60 Hz). In extreme cases (e.g., a loss of a large portion of power generating capacity), the power system frequency level falls outside the 60+/−0.035 Hz deadband used for most power generating systems. This results in further degradation of the power system as generators trip off-line due to their inability to function outside the deadband. An amount of time for a response is measured in cycles (1/60th of a second) as a destructive interference between grid power and generator output may result in equipment damage. With communication delays measuring in seconds to minutes, this time may not be sufficient to avert a catastrophe. Therefore, system 2 enables a function by which the further the system frequency deviates from the 60 Hz nominal value the more and potentially faster system 2 responds. For example, although a frequency drop to 59 Hz may not be harmful to motors in most air conditioning compressors, system 2 may request that an air conditioning system, hot water heater, electric heater, or other high demand device take a 5 minute break in the event the system frequency dropped below 59 Hz.

The following steps illustrate a set up process performed by computing system 8 of system 2 for prioritizing a shutoff order for power consumption devices 14a . . . 14n:

1. Pre-register power consumption devices 14a . . . 14n for identification.
2. Detect power usage patterns (i.e., an amount of power consumption) of power consumption devices 14a . . . 14n.
3. Generate a prioritization list indicating a shutoff order for power consumption devices 14a . . . 14n. The prioritization list is generated based on the power usage patterns detected in step 2 and optionally user input.

The following steps illustrate a load adjustment modification process performed by computing system 8 based on a value of a monitored frequency signal on the power grid (e.g., from utility(s) 5 and the prioritization list generated in set up process as described, supra:

1. Computing system monitors a frequency signal associated with a voltage generated by utility(s) 5. If computing system 8 detects frequency signal level drop below a normal level (e.g., 60 Hz), this indicates a shortage of supply power and/or excess power demand. Likewise, if computing system 8 detects frequency signal level rise above a normal level (e.g., 60 Hz), this indicates an over abundance of supply power and/or not enough power demand.

A. If the monitored frequency signal level is plus or minus a deadband value for the nominal line frequency (e.g., 60 Hz in North America and the Caribbean, 50 Hz in Europe, parts of Africa, Asia, and Australia, etc), least critical power consumption devices (e.g., a TV, a radio, a clock, etc) are disconnected or enabled according to the prioritization list.

B. If the monitored frequency signal is greater than the nominal frequency level by more the deadband amount, a system load is increased by enabling additional power consumption devices that consume a great deal of power (e.g., an air conditioner, a battery charger, a heater, etc) according to the prioritization list.

C. If the monitored frequency signal is less than the nominal frequency by more than the deadband amount, a system load is decreased by disabling power consumption devices that consume a great deal of power (e.g., an air conditioner, a battery charger, a heater, etc) according to the prioritization list.

2. Computing system 8 continues to monitor power frequency signal associated with the voltage generated by utility(s) 5 and continues to enable or disable power consumption devices until power supply/demand balance is restored.

Computing system 8 may prioritize enabling/disabling power consumption devices (e.g., power consumption devices 14a . . . 14n) by device grouping prioritization or independent device prioritization.

Device Grouping Prioritization

Computing system 8 may prioritize enabling/disabling of power consumption devices by specifying groups of power consumption devices that are responsive to variations in frequency. The groups of power consumption devices may vary by, inter alia, a time of day, a day of the week, ambient conditions, etc.

Independent Device Prioritization

If power frequency level drop is small, only a small amount of power consumption device throttling may be necessary. In this case, power consumption devices that use smaller amounts of power may be throttled if they comprise a lower priority than other power consumption devices.

Table 1 illustrates a listing of power consumption devices (and associated groups) as they are pre-registered (i.e., identified) into computing system 8 either manually or through an auto-discover process.

TABLE 1

| Power Consumption Device | Groups |
|---|---|
| Air Conditioner | N/A |
| Refrigerator | N/A |
| Water Heater | N/A |
| Bedroom TV | Bedroom |
| Bedroom DVD | Bedroom |
| Pool Pump | Swimming Pool |
| Pool Heater | Swimming Pool |
| Pool Lights | Swimming Pool |
| Lights | Critical |
| House Alarm | Critical |

Table 2 illustrates policy table (i.e., associated with table 1) specifying that as a frequency level drops further from 60 Hz, additional power consumption devices are turned off either individually or in groups.

TABLE 2

| Frequency Level | Deviation from 60 Hz | Action |
|---|---|---|
| 59.7 Hz-59.9 Hz | Very Small | Disable air conditioner and swimming pool group. Throttle hot water heater by reducing a temperature by 2 degrees |
| 59.5 Hz-59.7 Hz | Small | Disable water heater and refrigerator for 10 minutes |
| 59.3 Hz-59.5 Hz | Medium | Disable water heater |
| 59 Hz-59.3 Hz | Large | Disable refrigerator for 1 hour and disable bedroom group |
| <59 Hz | Very Large | Disable all devices except lights |

Figure 2:
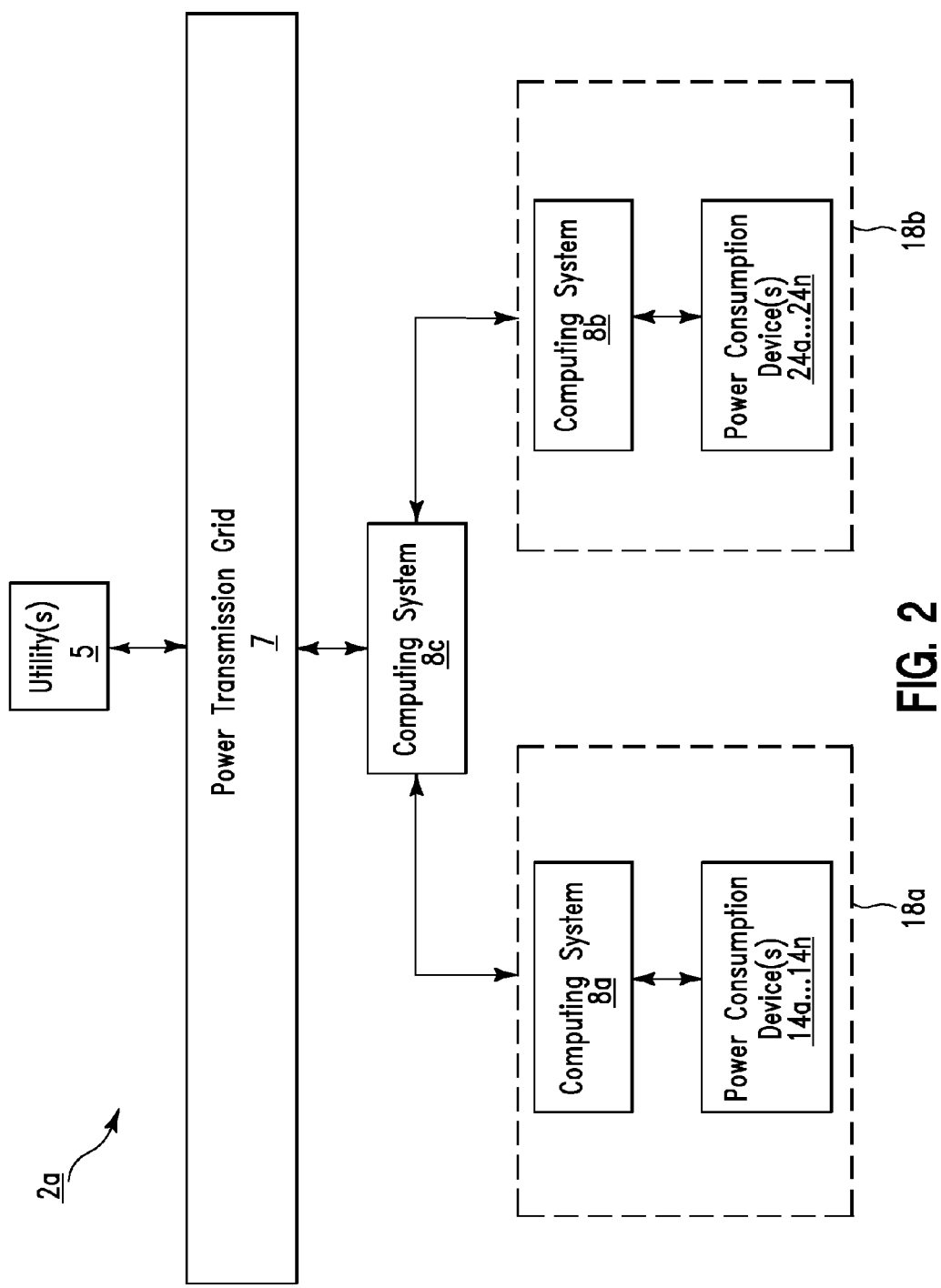
FIG. 2 illustrates an alternative system to the system of FIG. 1, in accordance with embodiments of the present invention.

FIG. 2 illustrates an alternative system 2a to system 2 of FIG. 1, in accordance with embodiments of the present invention. In contrast to system 2 of FIG. 1, system 2a of FIG. 2 comprises an additional regional (community) computing system 8c for monitoring a frequency signal associated with a supply voltage retrieved from a power grid and performing a load adjustment modification process with respect power consumption devices 14a . . . 14n at location 18a and power consumption devices 24a . . . 24n at location 18b based on a value of the frequency signal and a regional prioritization list. Locations 18a and 18b comprise locations as described with respect to location 18 of FIG. 1. Power consumption devices 14a . . . 14n and 24a . . . 24n comprise power consumption devices as described with respect to power consumption devices 14a . . . 14n of FIG. 1. Computing system 8c and optional computing system 8a and 8b each comprise a computing system as described with respect to computing system 8 of FIG. 1. Computing system 8c monitors a frequency signal associated with a supply voltage retrieved from a power transmission 7 and enables a load adjustment modification process with respect power consumption devices 14a . . . 14n at location 18a and power consumption devices 24a . . . 24n. Optional computing system 8a may be used as an interface for communications with and control of power to power consumption devices 14a . . . 14n. Optional computing system 8b may be used as an interface for communications with and control of power to power consumption devices 24a . . . 24n. Alternatively, computing system 8c may directly communicate with and directly enable or disable power for power consumption devices 14a . . . 14n and 24a . . . 24n without interfacing through computing system 8a and 8b computing system 8b.

The following steps illustrate a set up process performed by computing system 8c of system 2a for prioritizing a shutoff order for power consumption devices 14a . . . 14n and 24a . . . 24n at locations 18a and 18b:

1. Pre-register locations 18a and 18b.

1. Pre-register power consumption devices 14a . . . 14n and 24a . . . 24n for identification.

2. Detect power usage patterns (i.e., an amount of power consumption) of locations 18a and 18b and individual power consumption devices 14a . . . 14n and 24a . . . 24n.

3. Generate a prioritization list indicating a shutoff order for locations 18a and 18b and/or power consumption devices 14a . . . 14n and 24a . . . 24n. The prioritization list is generated based on the power usage patterns detected in step 2 and optionally user input.

The following steps illustrate a load adjustment modification process performed by computing system 8c based on a value of a monitored frequency signal on the power grid (e.g., from utility(s) 5 and the prioritization list generated in set up process as described, supra:

1. Computing system 8c monitors a frequency signal associated with a voltage generated by utility(s) 5. If computing system 8*c* detects frequency signal level drop below a normal level (e.g., 60 Hz), this indicates a shortage of supply power and/or excess power demand. Likewise, if computing system 8*c* detects frequency signal level rise above a normal level (e.g., 60 Hz), this indicates an over abundance of supply power and/or not enough power demand.

A. If the monitored frequency signal level is plus or minus a deadband value for the nominal line frequency (e.g., 60 Hz in North America and the Caribbean, 50 Hz in Europe, parts of Africa, Asia, and Australia, etc), least critical power consumption devices (e.g., a TV, a radio, a clock, etc) at locations 18*a* and 18*b* are disconnected or enabled according to the prioritization list. The prioritization list may specify how much power reduction or consumption is required for each of locations 18*a* and 18*b* and select least critical power consumption devices based on the amount of power reduction or consumption required for each of locations 18*a* and 18*b*.
  B. If the monitored frequency signal is greater than the nominal frequency level by more the deadband amount, a system load is increased by enabling specified additional power consumption devices (e.g., a water heater, a furnace, an air conditioning unit, a TV, etc) at each of locations 18*a* and 18*b* that consume a great deal of power (e.g., an air conditioner, a battery charger, a heater, etc) according to the prioritization list.
  C. If the monitored frequency signal is less than the nominal frequency by more than the deadband amount, a system load is decreased by disabling power consumption devices at each of locations 18*a* and 18*b* that consume a great deal of power (e.g., an air conditioner, a battery charger, a heater, etc) according to the prioritization list.

2. Computing system 8 continues to monitor power frequency signal associated with the voltage generated by utility(s) 5 and continues to enable or disable power consumption devices at locations 18*a* and 18*b* until power supply/demand balance is restored.

Figure 3:
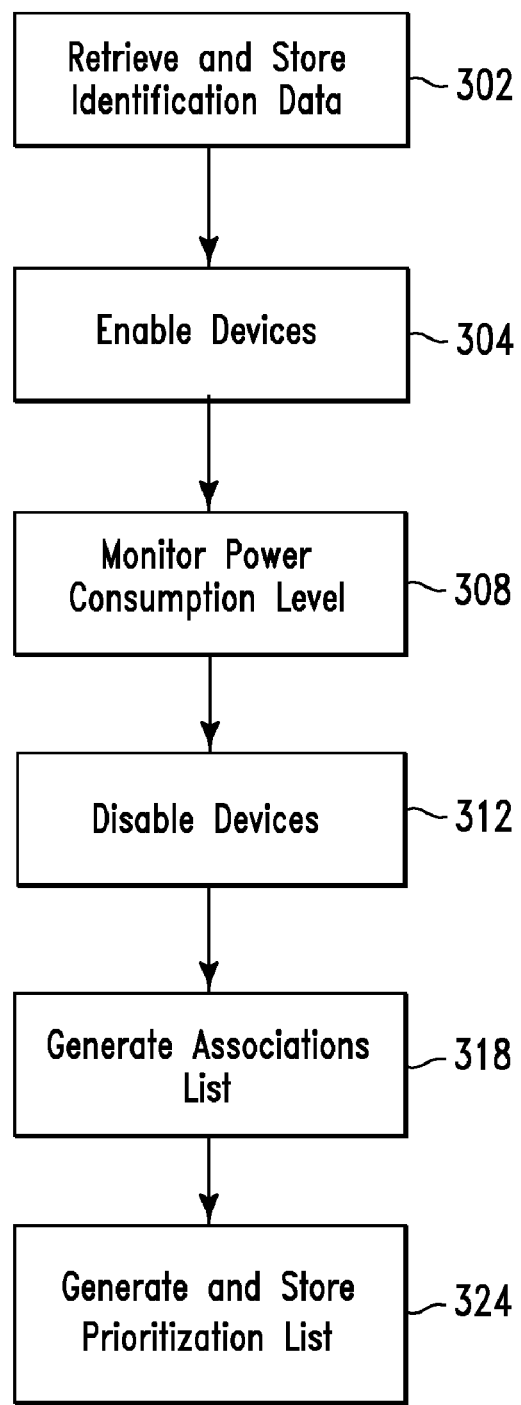
FIG. 3 illustrates a flowchart describing an algorithm used by the system of FIGS. 1 and 2 for prioritizing an order for enabling or disabling power consumption devices in one or more locations, in accordance with embodiments of the present invention.

FIG. 3 illustrates a flowchart describing an algorithm used by system 2 of FIG. 1 or system 2*a* of FIG. 2 for prioritizing an order for enabling or disabling power consumption devices in one or more locations, in accordance with embodiments of the present invention. In step 302, a computing system (e.g., a computer processor of computing system 8 of FIG. 1 or a computer processor of computing apparatus 8*c* of FIG. 2) retrieves and stores identification data identifying a power consumption devices at a single location (e.g., locally at the single location) or multiple locations (e.g., at a regional location). In step 304, the computing apparatus independently enables each power consumption device (e.g., at a same location or at different locations) such that each said power consumption device receives an input voltage signal and consumes power. In step 308, the computing system independently monitors and stores (i.e., in response to the enabling in step 304) a power consumption level for each power consumption device. In step 312, the computing system disables each power consumption device such that each power consumption device does not receive the input voltage signal and consume power. In step 318, the computing system generates an association list comprises associating each power consumption level with the identification data such that each power consumption level is associated with a different power consumption device. In step 324, the computing system generates and stores a prioritization list indicating an order of priority for disabling or enabling the power consumption devices. The prioritization list is generated based on the association list, each power consumption level, and user input. The user input may include data indicating a time of day, a day of the week, ambient conditions, etc. in order to prioritize in response to various conditions.

Figure 4:
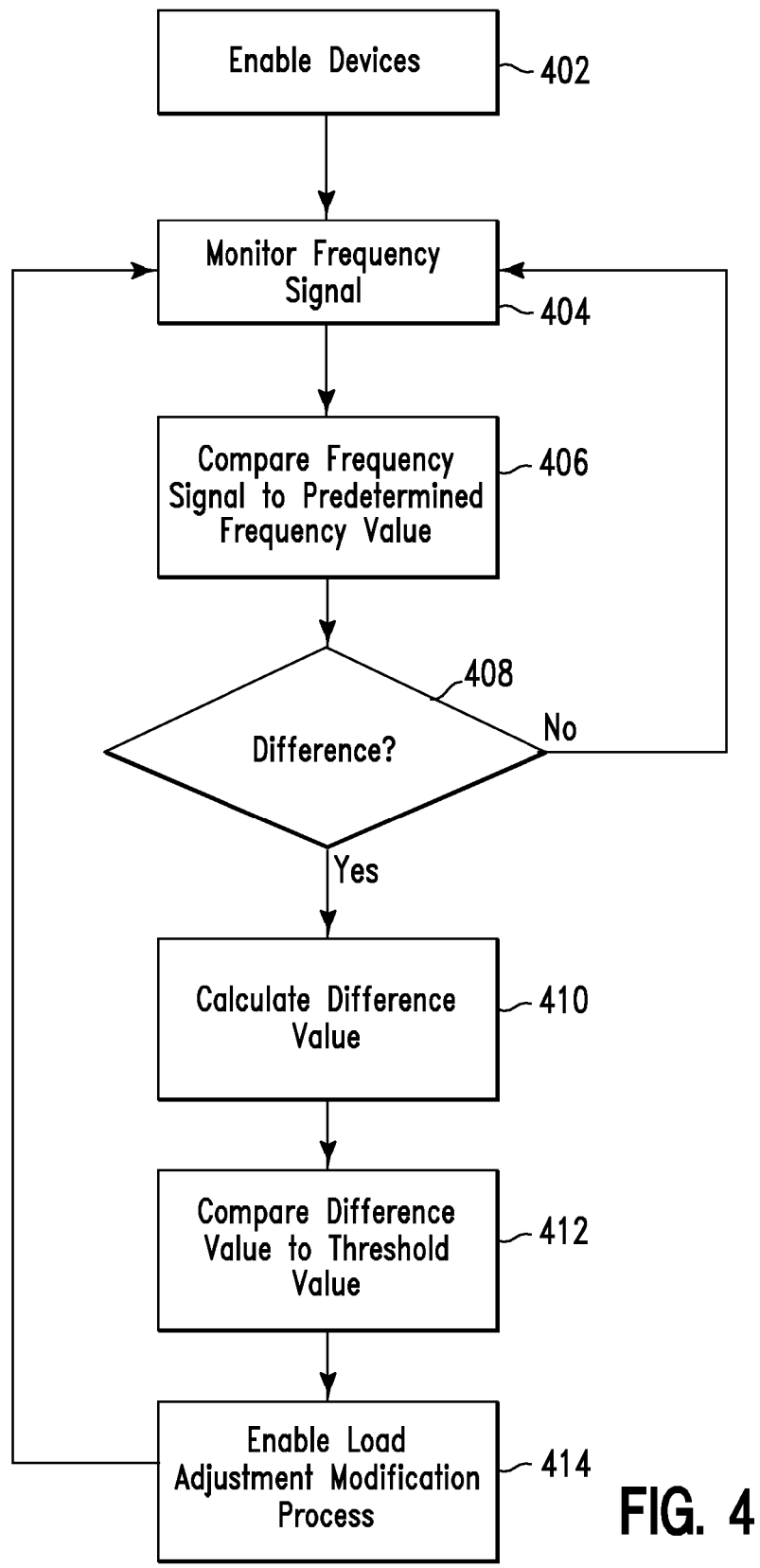
FIG. 4 illustrates a flowchart describing an algorithm used by the system FIGS. 1 and 2 for monitoring a frequency signal associated with a supply voltage retrieved from a power grid and performing a load adjustment modification process, in accordance with embodiments of the present invention.

FIG. 4 illustrates a flowchart describing an algorithm used by system 2 of FIG. 1 or system 2*a* of FIG. 2 for monitoring a frequency signal associated with a supply voltage retrieved from a power grid and performing a load adjustment modification process with respect to power consumption devices (in one or more locations) based on a value of the frequency signal and a prioritization list, in accordance with embodiments of the present invention. In step 402, a computing system (e.g., a computer processor of computing system 8 of FIG. 1 or a computer processor of computing apparatus 8*c* of FIG. 2) enables all or some of the power consumption devices at one or more locations such that each power consumption device receives an input voltage signal (from a utility such as, inter alia, utility 5 of FIG. 1 or 2 via a power grid such as, inter alia, power transmission grid 7 of FIG. 1 or 2) and consumes power. In step 404, the computing system detects and monitors a frequency signal associated with the input voltage signal. In step 406, the computing system compares (i.e., during a first specified time period) a current frequency signal level to a predetermined frequency level value (e.g., 60 Hz). In step 408, the computing system determines if a difference exists between the current frequency signal level and the predetermined frequency value (i.e., the frequency signal level currently comprises a first value that is not equal to the predetermined frequency value). If in step 408, the computing system determines that a difference does not exist between the current frequency signal level and the predetermined frequency value then step 404 is repeated. If in step 408, the computing system determines that a difference does exist between the current frequency signal level and the predetermined frequency value then in step 410, the computing system calculates a difference value between the first value and the predetermined frequency value. In step 412, the computing system compares the difference value to a threshold value. In step 414, the computing system enables (i.e., based on results of comparing the difference value to the threshold value and the prioritization list) a load adjustment modification process associated with the power consumption devices at one or more locations and step 404 is repeated. The load adjustment modification process of step 414 may be enabled in accordance with the following configurations:

1. The results of step 406 indicate that the predetermined frequency value exceeds the value of the frequency signal. In response, the computing system disables (i.e., in accordance with the prioritization list), an input voltage signal connection associated with a first power consumption device (i.e., disables the first power consumption device from receiving the input voltage signal) at a first location. The computing system continues to monitor the frequency signal associated with the input voltage signal and compares the current frequency signal to the predetermined frequency value. If a current frequency level value of the frequency signal is about equal to the predetermined frequency value, then step 404 is repeated. If a current frequency level value of the frequency signal is less than the predetermined frequency value then the computing system disables an input voltage signal connection associated with an additional power consumption device (i.e., disables the additional power consumption device from receiving the input voltage signal). The additional power consumption device may be located at a same location as the first power consumption device. Alternatively, the additional power consumption device may be located at a different location from the first power consumption device. The aforementioned monitoring and disabling process continues until a current frequency level value of the frequency signal is about equal to the predetermined frequency value.

2. The results of step 412 indicate that the predetermined frequency value exceeds the current frequency signal level value by more than the threshold value. In response, the computing system disables (i.e., in accordance with the prioritization list), an input voltage signal connection associated with a first power consumption device (i.e., disables the first power consumption device from receiving the input voltage signal) at a first location. The first power consumption device comprises a power consumption rate that exceeds a power consumption rate for any other power consumption device of the prioritization list. The computing system continues to monitor the frequency signal associated with the input voltage signal and compares a current frequency signal to the predetermined frequency value. If a current frequency level value of the frequency signal is about equal to the predetermined frequency value, then step 404 is repeated. If a current frequency level value of the frequency signal is less than the predetermined frequency value (e.g., by more than the threshold value) then the computing system disables an input voltage signal connection associated with an additional power consumption device (i.e., disables the additional power consumption device from receiving the input voltage signal). The additional power consumption device may be located at a same location as the first power consumption device. Alternatively, the additional power consumption device may be located at a different location from the first power consumption device. The aforementioned monitoring and disabling process continues until a current frequency level value of the frequency signal is about equal to the predetermined frequency value.

3. The results of step 412 indicate that the predetermined frequency value exceeds the current frequency signal level value by less than the threshold value. In response, the computing system disables (i.e., in accordance with the prioritization list), an input voltage signal connection associated with a first power consumption device (i.e., disables the first power consumption device from receiving the input voltage signal) at a first location. The first power consumption device comprises a power consumption rate that comprises a least critical device as compared to any other power consumption device of the prioritization list. The computing system continues to monitor the frequency signal associated with the input voltage signal and compares a current frequency signal to the predetermined frequency value. If a current frequency level value of the frequency signal is about equal to the predetermined frequency value, then step 404 is repeated. If a current frequency level value of the frequency signal is less than the predetermined frequency value then the computing system disables an input voltage signal connection associated with an additional (least critical) power consumption device (i.e., disables the additional power consumption device from receiving the input voltage signal). The additional power consumption device may be located at a same location as the first power consumption device. Alternatively, the additional power consumption device may be located at a different location from the first power consumption device. The aforementioned monitoring and disabling process continues until a current frequency level value of the frequency signal is about equal to the predetermined frequency value.

4. The results of step 406 indicate that the value of the frequency signal exceeds the predetermined frequency value. In response, the computing system enables (i.e., in accordance with the prioritization list), an input voltage signal connection associated with a first power consumption device (i.e., enables the first power consumption device to receive the input voltage signal) at a first location. The computing system continues to monitor the frequency signal associated with the input voltage signal and compares the current frequency signal to the predetermined frequency value. If a current frequency level value of the frequency signal is about equal to the predetermined frequency value, then step 404 is repeated. If a current frequency level value of the frequency signal is greater than the predetermined frequency value then the computing system enables an input voltage signal connection associated with an additional power consumption device (i.e., enables the additional power consumption device to receive the input voltage signal). The additional power consumption device may be located at a same location as the first power consumption device. Alternatively, the additional power consumption device may be located at a different location from the first power consumption device. The aforementioned monitoring and enabling process continues until a current frequency level value of the frequency signal is about equal to the predetermined frequency value.

5. The results of step 412 indicate that the current frequency signal level exceeds the predetermined frequency value by more than the threshold value. In response, the computing system enables (i.e., in accordance with the prioritization list), an input voltage signal connection associated with a first power consumption device (i.e., enables the first power consumption device to receive the input voltage signal) at a first location. The first power consumption device comprises a power consumption rate that exceeds a power consumption rate for any other power consumption device of the prioritization list. The computing system continues to monitor the frequency signal associated with the input voltage signal and compares a current frequency signal to the predetermined frequency value. If a current frequency level value of the frequency signal is about equal to the predetermined frequency value, then step 404 is repeated. If a current frequency level value of the frequency signal is greater than the predetermined frequency value (e.g., by more than the threshold value) then the computing system enables an input voltage signal connection associated with an additional power consumption device (i.e., enables the additional power consumption device to receive the input voltage signal). The additional power consumption device may be located at a same location as the first power consumption device. Alternatively, the additional power consumption device may be located at a different location from the first power consumption device. The aforementioned monitoring and enabling process continues until a current frequency level value of the frequency signal is about equal to the predetermined frequency value.

6. The results of step 412 indicate that the predetermined frequency value exceeds the current frequency signal level value by less than the threshold value. In response, the computing system enables (i.e., in accordance with the prioritization list), an input voltage signal connection associated with a first power consumption device (i.e., enables the first power consumption device to receive the input voltage signal) at a first location. The first power consumption device comprises a power consumption rate that comprises a least critical device as compared to any other power consumption device of the prioritization list. The computing system continues to monitor the frequency signal associated with the input voltage signal and compares a current frequency signal to the predetermined frequency value. If a current frequency level value of the frequency signal is about equal to the predetermined frequency value, then step 404 is repeated. If a current frequency level value of the frequency signal is greater than the predetermined frequency value then the computing system enables an input voltage signal connection associated with an additional (least critical) power consumption device (i.e., enables the additional power consumption device to receive the input voltage signal). The additional power consumption device may be located at a same location as the first power consumption device. Alternatively, the additional power consumption device may be located at a different location from the first power consumption device. The aforementioned monitoring and disabling process continues until a current frequency level value of the frequency signal is about equal to the predetermined frequency value.

Figure 5:
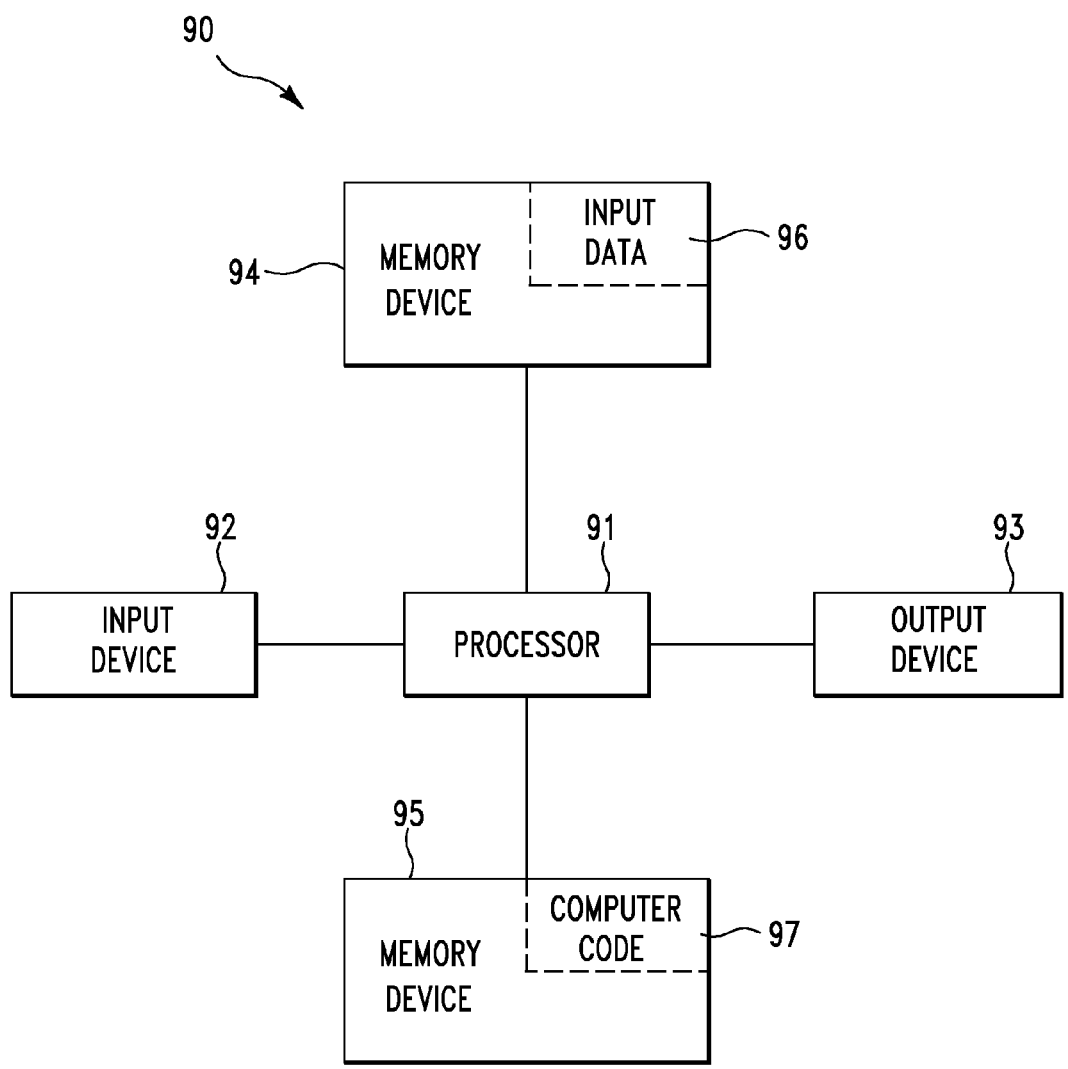
FIG. 5 illustrates a computer apparatus used for generating a prioritization list and performing a load adjustment modification process, in accordance with embodiments of the present invention.

FIG. 5 illustrates a computer apparatus 90 (e.g., computing system 8a, 8b, or 8c of FIGS. 1 and 2) used for generating a prioritization list, monitoring a frequency signal associated with a supply voltage retrieved from a power grid, and performing a load adjustment modification process, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3-4) for generating a prioritization list, monitoring a frequency signal associated with a supply voltage retrieved from a power grid, and performing a load adjustment modification process. The processor 91 enables the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 3-4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service supplier who offers to generate a prioritization list, monitor a frequency signal associated with a supply voltage retrieved from a power grid, and perform a load adjustment modification process. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for generating a prioritization list, monitoring a frequency signal associated with a supply voltage retrieved from a power grid, and performing a load adjustment modification process. In another embodiment, the invention provides a business method that performs the process steps of the invention on a subscription, advertising, and/or fee basis. That is, a service supplier, such as a Solution Integrator, could offer generate a prioritization list, monitor a frequency signal associated with a supply voltage retrieved from a power grid, and perform a load adjustment modification process. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A power management method comprising:
retrieving, by a computer processor of a computing system, identification data identifying a plurality of power consumption devices at a specified location;
storing, by said computer processor, said identification data;
independently enabling, by said computer processor, each power consumption device of said plurality of power consumption devices such that each said power consumption device receives an input voltage signal and consumes power;
independently monitoring, by said computer processor in response to said independently enabling, a power consumption level for each said power consumption device;
after said independently monitoring, independently disabling by said computer processor, each said power consumption device such that each said power consumption device does not receive said input voltage signal and consume power;
after said independently disabling, generating by said computer processor, an association list, wherein said generating said association list comprises associating each said power consumption level with said identification data such that each said power consumption level is associated with a different power consumption device of said plurality of power consumption devices;
generating, by said computer processor from said association list and based on each said power consumption level and user input, a prioritization list indicating an order of priority for disabling said plurality of power consumption devices, wherein said prioritization list specifies multiple different frequency level ranges, associated deviation amounts from a specified frequency f or each frequency level range of said multiple different frequency level ranges, and actions associated with each deviation amounts of said associated deviation amounts, and wherein said actions comprise power enable/disable commands associated with specific time periods;
storing, by said computer processor, said prioritization lists;
after said storing said prioritization list, enabling by said computer processor, a group of power consumption devices of said plurality of power consumption devices such that each power consumption device of said group receives said input voltage signal and consumes power;

detecting, by said computer processor, a frequency signal associated with said input voltage signal;

monitoring, by said computer processor, said frequency signal;

first comparing, by said computer processor during a first specified time period, said frequency signal to a predetermined frequency value;

determining, by said computer processor based on said first comparing, that said frequency signal comprises a first value that is not equal to said predetermined frequency value;

calculating, by said computer processor, a difference value between said first value and said predetermined frequency value;

second comparing, by said computer processor, said difference value to a threshold value;

evaluating, by said computer processor, said prioritization list with respect to said frequency signal and results of said second comparing;

determining, by said computer processor, based on results of said evaluating, that said frequency signal is associated with a first frequency level range of said multiple different frequency level ranges; and enabling, by said computer processor based on said results of said second comparing and said evaluating said prioritization list, a load adjustment modification process associated with said group of said plurality of power consumption devices at said specified location, wherein said load adjustment process comprises enabling a first action of said actions associated with said first frequency level range, said results of said second comparing, and a deviation amount of said deviation amounts, and wherein said first action is enabled for a first specified time period of said specific time periods.

2. The method of claim 1, wherein said results of said first comparing indicate that said predetermined frequency value exceeds said first value of said frequency signal, and wherein said load adjustment modification process comprises:

first disabling, by said computer processor in response to said results of said first comparing and in accordance with said prioritization list, a first input voltage signal connection associated with a first power consumption device of said group of said plurality of power consumption devices, wherein said first disabling said first input voltage signal connection disables said first power consumption device from receiving said input voltage signal;

second monitoring, by said computer processor in response to said first disabling, said frequency signal associated with said input voltage signal at said first specified location;

third comparing, by said computer processor during a second specified time period, said frequency signal to said predetermined frequency value; and determining, by said computer processor based on said first comparing, that said frequency signal comprises a second value that is about equal to said predetermined frequency value.

3. The method of claim 1, wherein said results of said first comparing and results of said second comparing indicate that said predetermined value exceeds said first value by more than said threshold value, and wherein said load adjustment modification process comprises:

first disabling, by said computer processor in response to said results of said first comparing and results of said second comparing, a first input voltage signal connection associated with a first power consumption device of said group of said plurality of power consumption devices, wherein said first disabling said first input voltage signal connection disables said first power consumption device from receiving said input voltage signal, and wherein said first power consumption device comprises a power consumption rate that exceeds a power consumption rate for any other power consumption device of said group of said plurality of power consumption devices;

second monitoring, by said computer processor in response to said first disabling, said frequency signal associated with said input voltage signal at said first specified location;

third comparing, by said computer processor during a second specified time period, said frequency signal to said predetermined frequency value; and determining, by said computer processor based on said first comparing, that said frequency signal comprises a second value that is about equal to said predetermined frequency value.

4. The method of claim 1, wherein said results of said first comparing and results of said second comparing indicate that said predetermined value exceeds said first value by less than said threshold value, and wherein said load adjustment modification process comprises:

first disabling, by said computer processor in response to said results of said first comparing and said results of said second comparing, a first input voltage signal connection associated with a first power consumption device of said group of said plurality of power consumption devices, wherein said first disabling said first input voltage signal connection disables said first power consumption device from receiving said input voltage signal, and wherein said prioritization list indicates that said first power consumption device comprises a least critical power consumption device as compared to each other power consumption device of said group of said plurality of power consumption devices;

second monitoring, by said computer processor in response to said first disabling, said frequency signal associated with said input voltage signal at said first specified location;

third comparing, by said computer processor during a second specified time period, said frequency signal to said predetermined frequency value; and determining, by said computer processor based on said first comparing, that said frequency signal comprises a second value that is about equal to said predetermined frequency value.

5. The method of claim 1, wherein said results of said first comparing indicate that said first value of said frequency signal exceeds said predetermined frequency value, and wherein said load adjustment modification process comprises:

first enabling, by said computer processor in response to said results of said first comparing and in accordance with said prioritization list, a first input voltage signal connection associated with a first power consumption device of said plurality of power consumption devices, wherein said first enabling said first input voltage signal connection enables said first power consumption device to receive said input voltage signal;

second monitoring, by said computer processor in response to said first enabling, said frequency signal associated with said input voltage signal at said first specified location;

third comparing, by said computer processor during a second specified time period, said frequency signal to said predetermined frequency value; and determining, by said computer processor based on said first comparing, that said frequency signal comprises a second value that is about equal to said predetermined frequency value.

6. The method of claim 1, wherein said results of said first comparing and results of said second comparing indicate that said first value of said frequency signal exceeds said predetermined frequency value by more than said threshold value, and wherein said load adjustment modification process comprises:

first enabling, by said computer processor in response to said results of said first comparing and said results of said second comparing, a first input voltage signal connection associated with a first power consumption device of said group of said plurality of power consumption devices, wherein said first enabling said first input voltage signal connection enables said first power consumption device to receive said input voltage signal, and wherein said first power consumption device comprises a power consumption rate that exceeds a power consumption rate for any other power consumption device of said plurality of power consumption devices;

second monitoring, by said computer processor in response to said first enabling, said frequency signal associated with said input voltage signal at said first specified location;

third comparing, by said computer processor during a second specified time period, said frequency signal to said predetermined frequency value; and determining, by said computer processor based on said first comparing, that said frequency signal comprises a second value that is about equal to said predetermined frequency value.

7. The method of claim 1, wherein said results of said first comparing and results of said second comparing indicate that said first value of said frequency signal exceeds said predetermined frequency value by less than said threshold value, and wherein said load adjustment modification process comprises:

first enabling, by said computer processor in response to said results of said first comparing and said results of said second comparing, a first input voltage signal connection associated with a first power consumption device of said group of said plurality of power consumption devices, wherein said first enabling said first input voltage signal connection enables said first power consumption device to receives said input voltage signal, and wherein said prioritization list indicates that said first power consumption device comprises a power consumption device that consumes a least amount of power as compared to each other power consumption device of said plurality of power consumption devices;

second monitoring, by said computer processor in response to said first enabling, said frequency signal associated with said input voltage signal at said first specified location;

third comparing, by said computer processor during a second specified time period, said frequency signal to said predetermined frequency value; and determining, by said computer processor based on said first comparing, that said frequency signal comprises a second value that is about equal to said predetermined frequency value.

8. The method of claim 1, wherein said group of power consumption devices comprises all power consumption devices of said plurality of power consumption devices.

9. A computer program product, comprising a computer storage device storing a computer readable program code, said computer readable program code configured to perform a method upon being executed by a computer processor of a computing system, said method comprising:

retrieving, by said computer processor, identification data identifying a plurality of power consumption devices at a specified location;

storing, by said computer processor, said identification data;

independently enabling, by said computer processor, each power consumption device of said plurality of power consumption devices such that each said power consumption device receives an input voltage signal and consumes power;

independently monitoring, by said computer processor in response to said independently enabling, a power consumption level for each said power consumption device;

after said independently monitoring, independently disabling by said computer processor, each said power consumption device such that each said power consumption device does not receive said input voltage signal and consume power;

after said independently disabling, generating by said computer processor, an association list, wherein said generating said association list comprises associating each said power consumption level with said identification data such that each said power consumption level is associated with a different power consumption device of said plurality of power consumption devices;

generating, by said computer processor from said association list and based on each said power consumption level and user input, a prioritization list indicating an order of priority for disabling said plurality of power consumption devices, wherein said prioritization list specifies multiple different frequency level ranges, associated deviation amounts from a specified frequency f or each frequency level range of said multiple different frequency level ranges, and actions associated with each deviation amounts of said associated deviation amounts, and wherein said actions comprise power enable/disable commands associated with specific time periods;

storing, by said computer processor, said prioritization list;

after said storing said prioritization list, enabling by said computer processor, a group of power consumption devices of said plurality of power consumption devices such that each power consumption device of said group receives said input voltage signal and consumes power;

detecting, by said computer processor, a frequency signal associated with said input voltage signal;

monitoring, by said computer processor, said frequency signal;

first comparing, by said computer processor during a first specified time period, said frequency signal to a predetermined frequency value;

determining, by said computer processor based on said first comparing, that said frequency signal comprises a first value that is not equal to said predetermined frequency value;

calculating, by said computer processor, a difference value between said first value and said predetermined frequency value;
second comparing, by said computer processor, said difference value to a threshold value;
evaluating, by said computer processor, said prioritization list with respect to said frequency signal and results of said second comparing;
determining, by said computer processor, based on results of said evaluating, that said frequency signal is associated with a first frequency level range of said multiple different frequency level ranges; and
enabling, by said computer processor based on said results of said second comparing and said evaluating said prioritization list, a load adjustment modification process associated with said group of said plurality of power consumption devices at said specified location, wherein said load adjustment process comprises enabling a first action of said actions associated with said first frequency level range, said results of said second comparing, and a deviation amount of said deviation amounts, and wherein said first action is enabled for a first specified time period of said specific time periods.

10. A power management method comprising:
retrieving, by a computer processor of a computing system, identification data identifying groups of power consumption devices at multiple locations, wherein each group of said groups of said power consumption devices is associated with a different location of said multiple locations, and wherein said computing system is located external to said multiple locations;
storing, by said computer processor, said identification data;
retrieving, by said computer processor from said multiple locations, power consumption level data comprising power consumption levels for each power consumption device of said groups of said power consumption devices;
generating by said computer processor, an association list, wherein said generating said association list comprises associating said power consumption levels with said identification data such that each power consumption level of said power consumption levels is associated with a different power consumption device of said power consumption devices;
generating, by said computer processor from said association list and based on each said power consumption level and user input, a prioritization list indicating an order of priority for disabling each said power consumption device, wherein said prioritization list specifies multiple different frequency level ranges, associated deviation amounts from a specified frequency for each frequency level range of said multiple different frequency level ranges, and actions associated with each deviation amounts of said associated deviation amounts, and wherein said actions comprise power enable/disable commands associated with specific time periods;
storing, by said computer processor, said prioritization lists
after said storing said prioritization list, enabling by said computer processor, each said group of power consumption devices such that each said group receives an input voltage signal from a power transmission grid and consumes power;
detecting, by said computer processor, a frequency signal associated with said input voltage signal;
monitoring, by said computer processor, said frequency signal;
first comparing, by said computer processor during a first specified time period, said frequency signal to a predetermined frequency value;
determining, by said computer processor based on said first comparing, that said frequency signal comprises a first value that is not equal to said predetermined frequency value;
calculating, by said computer processor, a difference value between said first value and said predetermined frequency value;
second comparing, by said computer processor, said difference value to a threshold value;
evaluating, by said computer processor, said prioritization list with respect to said frequency signal and results of said second comparing;
determining, by said computer processor, based on results of said evaluating, that said frequency signal is associated with a first frequency level range of said multiple different frequency level ranges; and
enabling, by said computer processor based on results of said second comparing and said prioritization list, a load adjustment modification process associated with said groups of power consumption devices at said multiple locations wherein said load adjustment process comprises enabling a first action of said actions associated with said first frequency level range, said results of said second comparing, and a deviation amount of said deviation amounts, and wherein said first action is enabled for a first specified time period of said specific time periods.

11. The method of claim 10, wherein said results of said first comparing indicate that said predetermined frequency value exceeds said first value of said frequency signal, and wherein said load adjustment modification process comprises:
first disabling, by said computer processor in response to said results of said first comparing and in accordance with said prioritization list, a first input voltage signal connection associated with a first power consumption device of a first group of said power consumption devices associated with a first location of said multiple locations, wherein said first disabling said first input voltage signal connection disables said first power consumption device from receiving said input voltage signal;
second monitoring, by said computer processor in response to said first disabling, said frequency signal associated with said input voltage signal;
third comparing, by said computer processor during a second specified time period, said frequency signal to said predetermined frequency value;
determining, by said computer processor based on results of said third comparing, that said frequency signal comprises a second value that is less than said predetermined frequency value;
second disabling, by said computer processor in response to said results of said third comparing and in accordance with said prioritization list, a second input voltage signal connection associated with a second power consumption device of a second group of said power consumption devices associated with a second location of said multiple locations, wherein said second disabling said second input voltage signal connection disables said second power consumption device from receiving said input voltage signal;

third monitoring, by said computer processor in response to said second disabling, said frequency signal associated with said input voltage signal;

fourth comparing, by said computer processor during a third specified time period, said frequency signal to said predetermined frequency value; and determining, by said computer processor based on results of said fourth comparing, that said frequency signal comprises a third value that is about equal to said predetermined frequency value.

12. The method of claim 10, wherein said results of said first comparing and results of said second comparing indicate that said predetermined value exceeds said first value by more than said threshold value, and wherein said load adjustment modification process comprises:

first disabling, by said computer processor in response to said results of said first comparing and in accordance with said prioritization list, a first input voltage signal connection associated with a first power consumption device of a first group of said power consumption devices associated with a first location of said multiple locations, wherein said first disabling said first input voltage signal connection disables said first power consumption device from receiving said input voltage signal, and wherein said first power consumption device comprises a power consumption rate that exceeds a power consumption rate for any other power consumption device of said first group of said power consumption devices;

second monitoring, by said computer processor in response to said first disabling, said frequency signal associated with said input voltage signal;

third comparing, by said computer processor during a second specified time period, said frequency signal to said predetermined frequency value;

determining, by said computer processor based on results of said third comparing, that said frequency signal comprises a second value that is less than said predetermined frequency value;

second disabling, by said computer processor in response to said results of said third comparing and in accordance with said prioritization list, a second input voltage signal connection associated with a second power consumption device of a second group of said power consumption devices associated with a second location of said multiple locations, wherein said second disabling said second input voltage signal connection disables said second power consumption device from receiving said input voltage signal, and wherein said second power consumption device comprises a power consumption rate that exceeds a power consumption rate for any other power consumption device of said second group of said power consumption devices;

third monitoring, by said computer processor in response to said second disabling, said frequency signal associated with said input voltage signal;

fourth comparing, by said computer processor during a third specified time period, said frequency signal to said predetermined frequency value; and determining, by said computer processor based on results of said fourth comparing, that said frequency signal comprises a third value that is about equal to said predetermined frequency value.

13. The method of claim 10, wherein said results of said first comparing and results of said second comparing indicate that said predetermined value exceeds said first value by less than said threshold value, and wherein said load adjustment modification process comprises:

first disabling, by said computer processor in response to said results of said first comparing and in accordance with said prioritization list, a first input voltage signal connection associated with a first power consumption device of a first group of said power consumption devices associated with a first location of said multiple locations, wherein said first disabling said first input voltage signal connection disables said first power consumption device from receiving said input voltage signal, and wherein said first power consumption device comprises a power consumption rate that exceeds a power consumption rate for any other power consumption device of said first group of said power consumption devices, and wherein said prioritization list indicates that said first power consumption device comprises a least critical power consumption device as compared to each other power consumption device of said first group of said power consumption devices;

second monitoring, by said computer processor in response to said first disabling, said frequency signal associated with said input voltage signal;

third comparing, by said computer processor during a second specified time period, said frequency signal to said predetermined frequency value;

determining, by said computer processor based on results of said third comparing, that said frequency signal comprises a second value that is less than said predetermined frequency value;

second disabling, by said computer processor in response to said results of said third comparing and in accordance with said prioritization list, a second input voltage signal connection associated with a second power consumption device of a second group of said power consumption devices associated with a second location of said multiple locations, wherein said second disabling said second input voltage signal connection disables said second power consumption device from receiving said input voltage signal, and wherein said prioritization list indicates that said second power consumption device comprises a least critical power consumption device as compared to each other power consumption device of said second group of said power consumption devices;

third monitoring, by said computer processor in response to said second disabling, said frequency signal associated with said input voltage signal;

fourth comparing, by said computer processor during a third specified time period, said frequency signal to said predetermined frequency value; and determining, by said computer processor based on results of said fourth comparing, that said frequency signal comprises a third value that is about equal to said predetermined frequency value.

* * * * *